No. 627,478. Patented June 27, 1899.
E. L. BUCHWALTER & G. P. OATES.
AGITATOR FOR FERTILIZER FEED FOR SEEDING MACHINES.
(Application filed May 8, 1899.)
(No Model.) 3 Sheets—Sheet 1.

No. 627,478. Patented June 27, 1899.
E. L. BUCHWALTER & G. P. OATES.
AGITATOR FOR FERTILIZER FEED FOR SEEDING MACHINES.
(Application filed May 8, 1899.)
(No Model.) 3 Sheets—Sheet 2.
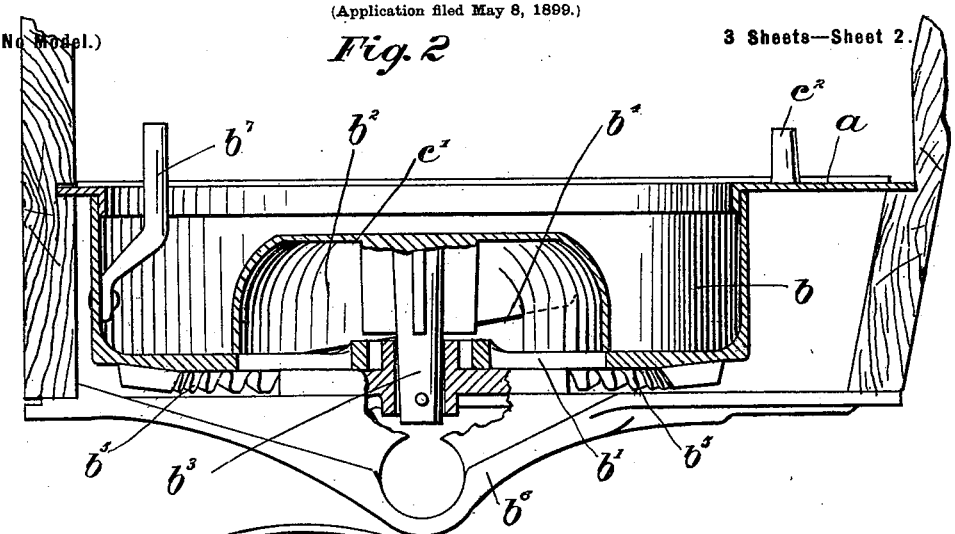
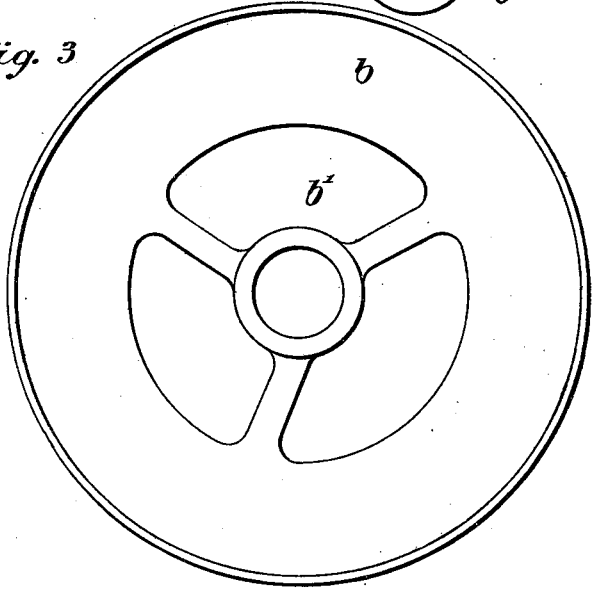
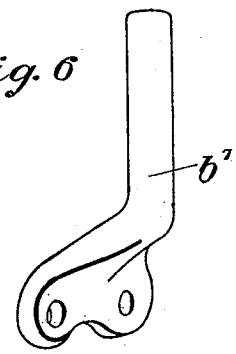
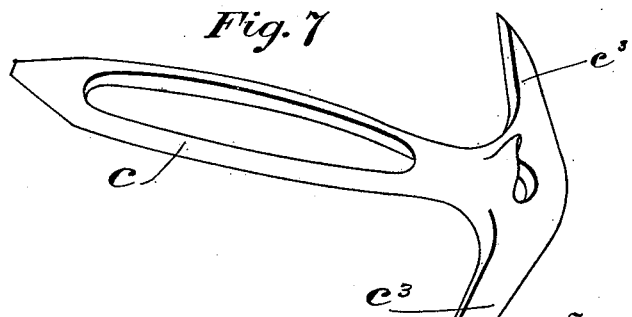
Witnesses
Darl G. Welch
Chas. I. Welch
Inventors
Edward L. Buchwalter
and George P. Oates
By their Attorney No. 627,478. Patented June 27, 1899.
E. L. BUCHWALTER & G. P. OATES.
AGITATOR FOR FERTILIZER FEED FOR SEEDING MACHINES.
(Application filed May 8, 1899.)
(No Model.) 3 Sheets—Sheet 3.

Witnesses
Earl G. Welch
Chas. I. Welch

Inventors
Edward L. Buchwalter
George P. Oates
By their Attorney

UNITED STATES PATENT OFFICE.

EDWARD L. BUCHWALTER AND GEORGE P. OATES, OF SPRINGFIELD, OHIO, ASSIGNORS TO THE SUPERIOR DRILL COMPANY, OF SAME PLACE.

AGITATOR FOR FERTILIZER-FEED FOR SEEDING-MACHINES.

SPECIFICATION forming part of Letters Patent No. 627,478, dated June 27, 1899.

Application filed May 8, 1899. Serial No. 715,951. (No model.)

*To all whom it may concern:*

Be it known that we, EDWARD L. BUCH-WALTER and GEORGE P. OATES, citizens of the United States, residing at Springfield, in the county of Clark and State of Ohio, have invented certain new and useful Improvements in Agitators for Fertilizer - Feed for Seeding-Machines, of which the following is a specification.

Our invention relates to improvements in agitators for fertilizer-feed for seeding-machines, and it especially relates to agitators for that class of fertilizer-feeds in which a revolving cup or hopper is adapted to operate in connection with a central stationary cam-shaped cap or cover arranged over the feeding-opening.

The object of our invention is to provide means for preventing the fertilizer material from bridging or sticking over the fertilizer-feeding mechanism in the hopper or from accumulating between the respective feeding mechanisms or against the walls of the hopper. We accomplish this object by the constructions shown in the accompanying drawings, in which—

Figure 1:
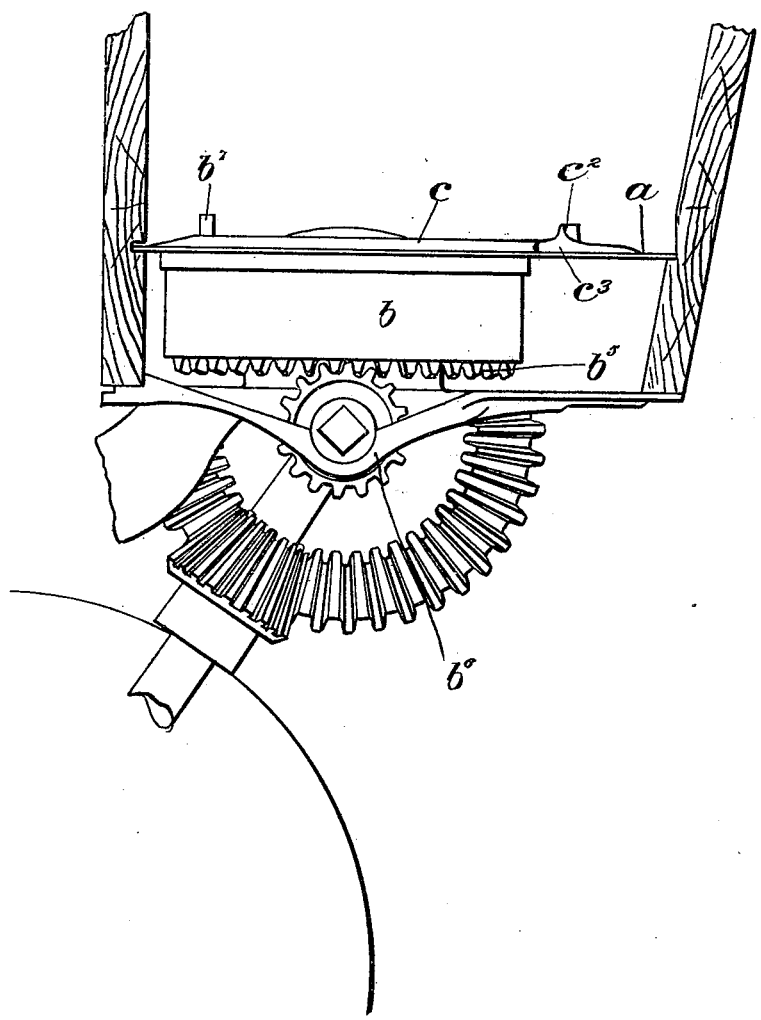
Figure 4:
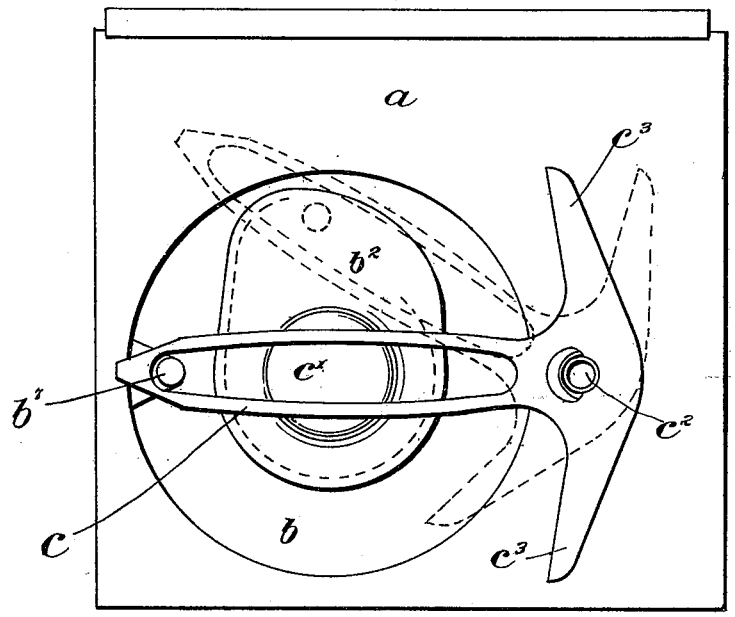
Figure 5:
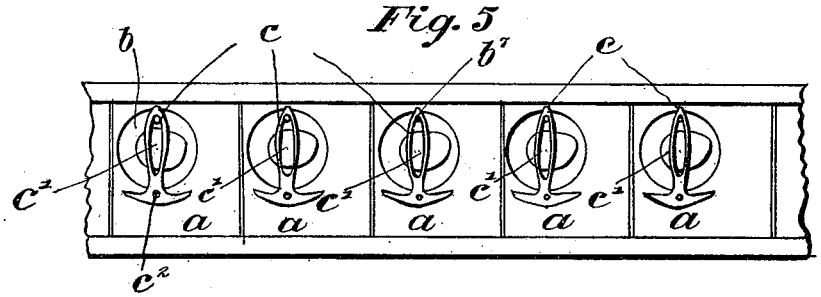

Figure 1 is a transverse sectional view through the hopper, showing one of the revolving feed cups or cylinders with our invention applied thereto. Fig. 2 is a sectional view through the feed-cup and cam-shaped cap therein and the support for the same. Fig. 3 is a top view of one of the revolving feeding-cups. Fig. 4 is a top view showing the manner of applying our improved device to one of the feeding cups or cylinders. Fig. 5 is a top view of a hopper of a seeding-machine containing our improved agitators. Figs. 6 and 7 are detail views.

Like parts are represented by similar letters of reference in the several views.

The fertilizer-feeding mechanism itself is arranged in a suitable hopper, and consists of a rotating cup or cylinder $b$, having openings $b'$ near the center, which openings are normally covered by a cap $c'$. The rotating cup or cylinder $b$ is adapted to revolve on the hollow sleeve or hub of a supporting-frame $b^6$ at the bottom of the hopper, rotary motion being imparted to said cup through the medium of suitable gearing in a well-known manner, as shown in Fig. 1, the cup being provided with teeth $b^5$ for that purpose. The cap $c'$ is extended at one side, as shown at $b^2$, so as to be eccentric to the revolving cup, and the eccentric portion has an opening $b^4$ on one side, and said eccentric portion of the cap is also beveled or wedge-shaped from this point toward the bottom of the cap and also toward the center, so that as the cup $b$ revolves the material carried thereby is forced through this opening and toward the center of the cup and out through the openings $b'$ at or near the center of the cup.

It will be understood that the cap $c'$ remains stationary while the cup revolves, the said cap being provided with a trunnion $b^3$, which extends through the hollow hub or sleeve on which the revolving cup is mounted and is secured stationarily therein by a pin, as shown in Fig. 2.

The revolving cup $b$ is provided with an upwardly-extending spur $b^7$, fastened on the inside so as to project upwardly into the hopper and so arranged as to pass the cap in its revolution. The bottom plate $a$ of the hopper is also provided with a stud $c^2$, and on this stud there is journaled a T-shaped agitator, the long arm $c$ of which is slotted to fit over the spur $b^7$ of the revolving cup. As the cup $b$ is revolved, therefore, the spur $b^7$ thereon, operating in the slot of the T-shaped agitator, will move the long arm of said agitator over the surface of the bottom plate of the hopper and across the top of the cup, while the short arms $c^3$ $c^3$ of said agitator will be given a reciprocating motion across the space between the respective cups and the wall of the hopper, the short arms $c^3$ $c^3$ of said agitator being preferably sharpened or beveled at the rear side to permit of their passing under the fertilizer material easily, as shown in Fig. 1, but the forward edges of said arms $c^3$ being substantially perpendicular, thus enabling them to carry such material that may be gathered before them into the revolving cup, the edges of the long arm of said T-shaped agitator being also preferably beveled for the same purpose. The spur $b^7$ is preferably extended high enough into the hopper to enable it to cut out and undermine the mass of fertilizer material during its rotation. By this construction it will be seen that the fertilizer or other material to be fed to the revolving feed-cups will be prevented from sticking or bridging over said feeding mechanism or from accumulating between the revolving feed-cups or against the sides of the hopper. By journaling the agitator loosely in said hopper without the use of bolts or nuts the same can be instantly removed for any purpose, while at the same time it does not require any peculiarly or specially formed hopper ends.

Having thus described our invention, we claim—

1. In a feeding device for seeding-machines, a stationary perforated plate, a rotating cylinder or cup, also perforated arranged below said plate, and a stationary cap in said cup arranged over the perforated bottom of said cup, an agitator pivoted to said stationary plate, and means for communicating motion to said agitator from said rotating cup to cause the same to reciprocate across the upper opening of said rotating cup, substantially as specified.

2. In a feeding mechanism for seeding-machines, a rotating feeding device arranged below a stationary perforated plate, a pivoted T-shaped agitator arranged above said stationary plate and adapted to reciprocate across the opening of said cup, and means on said cup for reciprocating said agitator by the rotary movement of said cup, substantially as specified.

3. The combination with the revolving cup or cylinder having an upwardly-projecting spur, a pivoted agitator above said cup having a slot to fit over the projecting spur on said revolving cup, substantially as and for the purpose specified.

4. In a seeding-machine, a rotating cylindrical feeding mechanism, and a T-shaped agitator pivoted to a stationary part above said rotating feeding mechanism, the long arm of said agitator being adapted to extend across the feeding-opening of said feeding mechanism and the T-shaped ends adapted to extend in opposite directions from the long arm and in proximity to said opening, and means for imparting motion to said agitator from said feeding mechanism, substantially as specified.

5. The combination with a stationary plate, a rotating feeding-cup, and a stationary cap in said cup, of a pivoted T-shaped agitator on said stationary plate, a spur on said rotating cup, and a slotted opening in said agitator to fit over said spur, substantially as and for the purpose specified.

6. A feeding mechanism for seeding-machines with a T-shaped agitator arranged above the same, the short arms of said T-shaped agitator being formed with their rear sides beveled and their front sides substantially perpendicular, the sides of the long arm of said agitator being also beveled, substantially as and for the purpose specified.

In testimony whereof we have hereunto set our hands this 21st day of November, A. D. 1898.

EDWARD L. BUCHWALTER.
GEORGE P. OATES.

Witnesses:
RICHARD H. RODGERS,
CHAS. I. WELCH.